(12) United States Patent
Jin et al.

(10) Patent No.: US 10,643,369 B2
(45) Date of Patent: May 5, 2020

(54) COMPILER-ASSISTED TECHNIQUES FOR MEMORY USE REDUCTION IN GRAPHICS PIPELINE

(71) Applicant: Advanced Micro Devices, Inc., Santa Clara, CA (US)

(72) Inventors: Guohua Jin, Boxborough, MA (US); Richard A. Burns, Boxborough, MA (US); Todd Martin, Orlando, FL (US); Gianpaolo Tommasi, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/992,239

(22) Filed: May 30, 2018

(65) Prior Publication Data

US 2019/0371041 A1    Dec. 5, 2019

(51) Int. Cl.
*G06T 15/00* (2011.01)
*G06T 1/60* (2006.01)
*G06T 17/20* (2006.01)

(52) U.S. Cl.
CPC .............. *G06T 15/005* (2013.01); *G06T 1/60* (2013.01); *G06T 17/20* (2013.01); *G06T 2200/04* (2013.01)

(58) Field of Classification Search
CPC ......... G06T 15/005; G06T 1/60; G06T 17/20; G06T 2200/04
USPC ....................................................... 345/520
See application file for complete search history.

(56) References Cited

U.S. PATENT DOCUMENTS

| 7,466,318 | B1* | 12/2008 | Kilgard | G06T 15/04 |
| | | | | 345/552 |
| 2006/0071933 | A1* | 4/2006 | Green | G06T 15/50 |
| | | | | 345/426 |
| 2011/0080415 | A1* | 4/2011 | Duluk, Jr. | G06T 1/20 |
| | | | | 345/506 |
| 2014/0043330 | A1* | 2/2014 | Ceylan | G06T 17/20 |
| | | | | 345/423 |
| 2014/0354644 | A1* | 12/2014 | Nystad | G06T 1/20 |
| | | | | 345/426 |
| 2016/0225118 | A1* | 8/2016 | Nevraev | G06T 1/20 |
| 2017/0061569 | A1 | 3/2017 | Sathe | |
| 2017/0178278 | A1 | 6/2017 | Drabinski et al. | |
| 2017/0358129 | A1 | 12/2017 | Chen et al. | |

* cited by examiner

*Primary Examiner* — Ke Xiao
*Assistant Examiner* — Kim Thanh T Tran
(74) *Attorney, Agent, or Firm* — Volpe and Koenig, P.C.

(57) ABSTRACT

Techniques for improving memory utilization for communication between stages of a graphics processing pipeline are disclosed. The techniques include analyzing output instructions of a first shader program to determine whether any such output instructions output some data that is not used by a second shader program. The compiler performs data packing if gaps exist between used output data to reduce memory footprint. The compiler generates optimized output instructions in the first shader program and optimized input instructions in the second shader program to output the used data from the first shader program and input that data in the second shader program in a packed format based on information about usage of output data and data packing. If needed, the compiler inserts instructions to perform runtime checking to identify unused output data of the first shader program based on information not known at compile-time.

20 Claims, 6 Drawing Sheets

FIG. 6

COMPILER-ASSISTED TECHNIQUES FOR MEMORY USE REDUCTION IN GRAPHICS PIPELINE

BACKGROUND

Three-dimensional graphics processing pipelines accept commands from a host (such as a central processing unit of a computing system) and process those commands to generate pixels to render on a display device. Graphics processing pipelines include a number of stages that perform individual tasks, such as transforming vertex positions and attributes, calculating pixel colors, and the like. Graphics processing pipelines are constantly being developed and improved.

BRIEF DESCRIPTION OF THE DRAWINGS

A more detailed understanding may be had from the following description, given by way of example in conjunction with the accompanying drawings wherein.

DETAILED DESCRIPTION

Techniques for improving memory utilization for communication between pipeline stages of a graphics processing pipeline are disclosed. The techniques include identifying shader programs for analysis. Such shader programs are identified by at least two shader programs where one (a first shader program) outputs data used by another (a second shader program). A compiler analyzes the output instructions of the first shader program to determine whether any such output instructions output any data that is not input by the second shader program. If one or more of such instructions exist, the compiler identifies the data points that are output by the first shader program and input by the second shader program, and avoids generating memory writes that write data points that are output by the first shader program but not input by the second shader program. If memory writes for the first shader program would lead to "gaps," in the data that is output, then the compiler modifies the memory writes to remove such gaps by using a packed format. This gap removal reduces the memory footprint and also, by aggregating multiple originally separated memory writes or reads into fewer memory access instructions, reduces the number of memory access instructions that are executed. Overall, these modifications result in fewer memory accesses, a smaller memory footprint, and increased effective bandwidth.

One particular part of the graphics pipeline for which this analysis is useful is in the part of the pipeline that implements tessellation, which includes the hull shader stage and the domain shader stage. Specifically, the hull shader outputs data, such as control points and patch constants (such as tessellation factors) for use by the domain shader. This data is typically output to a general purpose memory which is used for things other than tessellation. The hull shader includes instructions that each outputs multiple items of data (e.g., multiple control points, multiple tessellation factors). Further, hull shaders are generalizable, with multiple domain shaders typically being written to be used with a single hull shader. Thus it is common for hull shaders to output data not used by some domain shaders. Hull shaders are also able to know whether a patch will be culled based on computed tessellation factor values at runtime, and hull shaders thus know whether data for whole patches are used by the domain shader. The techniques described herein would be helpful to reduce the memory footprint and memory accesses of the data transferred from the hull shader to the domain shader.

Figure 1:
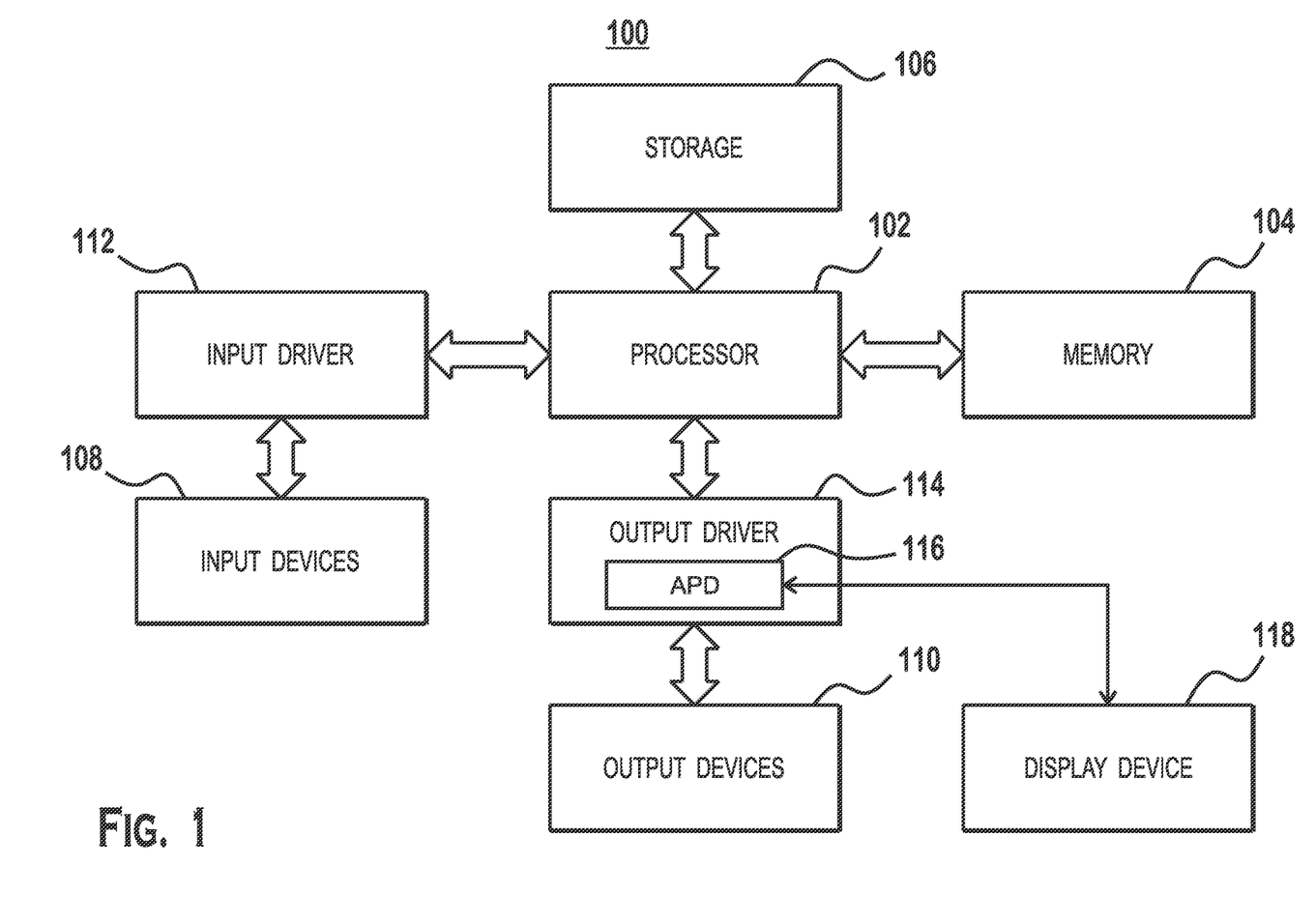
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
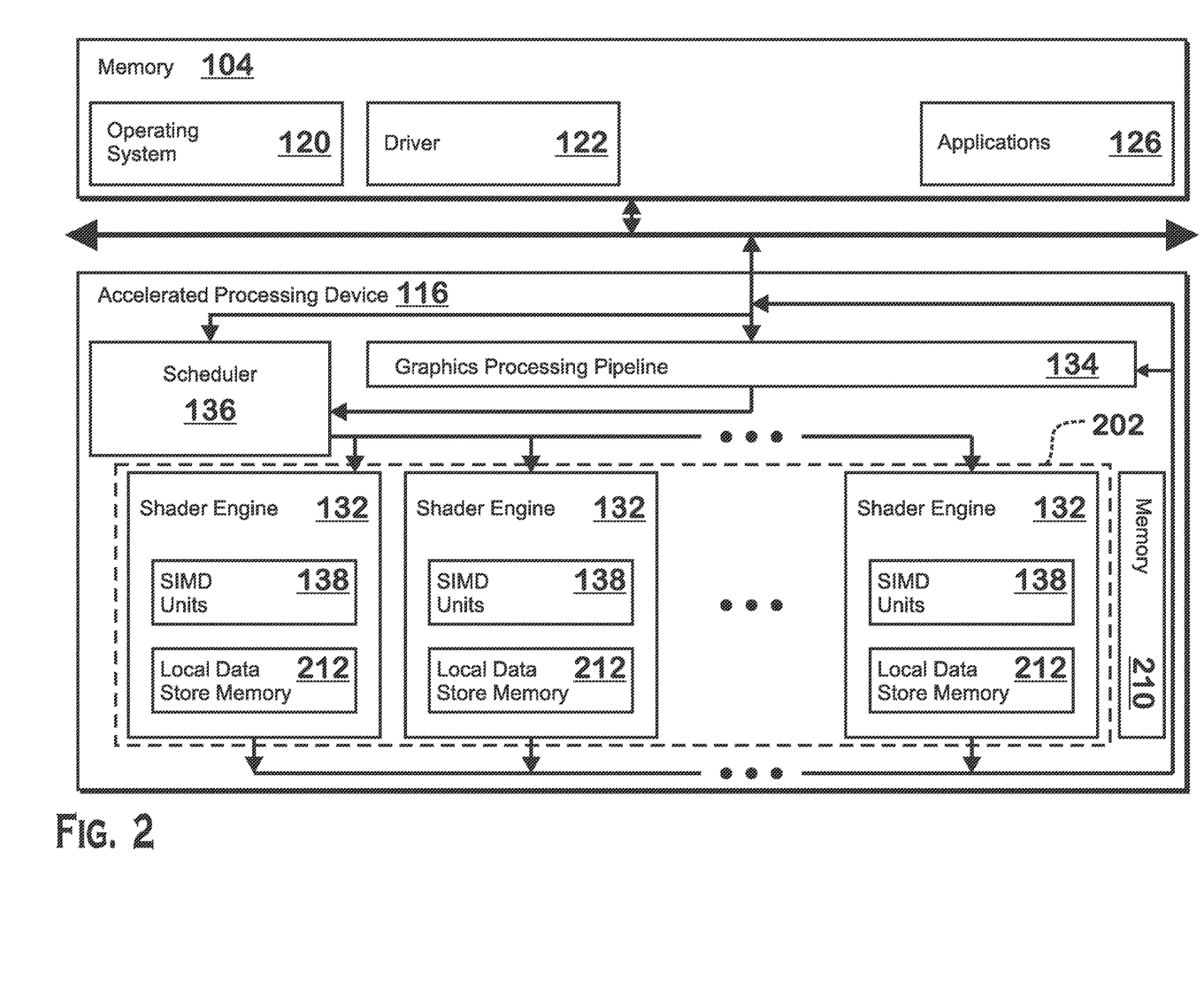
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a shader program that is to be executed in parallel in a particular lane. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data).

A local data store memory 212 in each shader engine 132 stores values for use by shader programs. The physical proximity of the local data store memory 212 provides improved latency as compared with other memories such as global memory 210 in the APD 116 that is not included within shader engines 132 or memory 104 that is not within the APD 116. A scheduler 136 is configured to perform operations related to scheduling various wavefronts on different shader engines 132 and SIMD units 138.

The parallelism afforded by the shader engines 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution.

Figure 3:
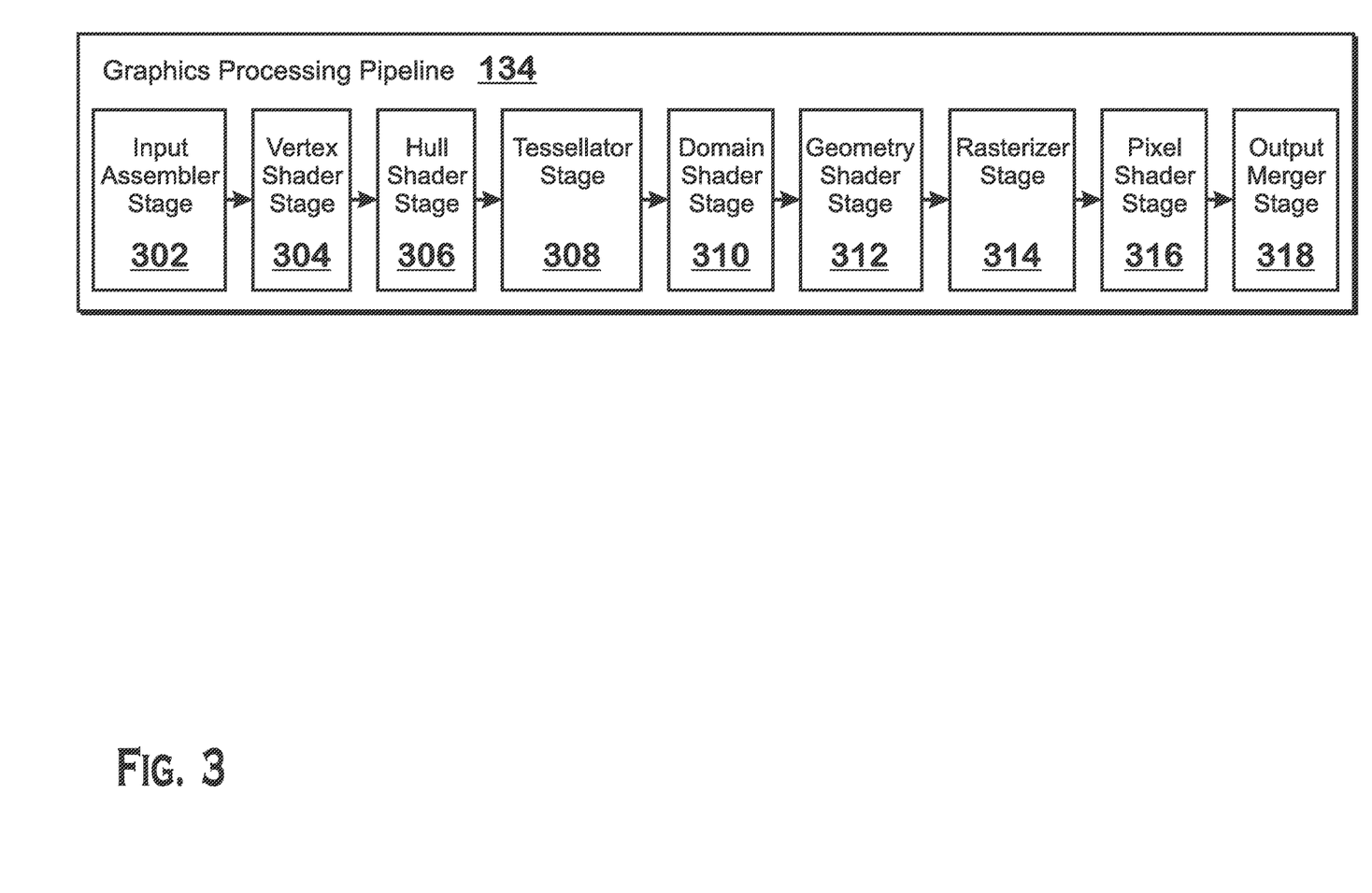
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transforms are considered to modify the coordinates or "position" of the vertices on which the transforms are performed. Other operations of the vertex shader stage 304 that modify attributes other than the coordinates are considered to modify non-position attributes.

The vertex shader stage 304 is implemented partially or fully as vertex shader programs to be executed on one or more shader engines 132. The vertex shader programs are provided by the processor 102 as programs that are pre-written by a computer programmer. The driver 122 compiles such computer programs to generate the vertex shader programs having a format suitable for execution within the shader engines 132.

The hull shader stage 306, tessellator stage 308, and domain shader stage 310 work together to implement tessellation, which converts patch primitives into a specified domain using subdivision. Examples of domain types include point, line, tri, and quad, and these domain types are capable of being rendered by the graphics processing pipeline 200. Either or both of the hull shader stage 306 and the domain shader stage 310 can be implemented as shader programs to be executed on the programmable processing units 202.

The hull shader stage 306 generates a patch for the tessellation based on an input primitive defined by a set of vertices and other information. More specifically, the hull shader stage 306 accepts input control points from the vertex shader stage 304, where these input control points define a geometric primitive (e.g., a triangle) to be processed by the hull shader stage 306. The input control points include position information that together define the shape and position of a patch. The hull shader stage 306 generates an output patch, along with patch constants, based on the input control points and the instructions of a programmable hull shader program. The output patch is defined at least in part by output control points that may or may not be the same as the input control points, based, again, on the instructions of the hull shader program. The output control points define the shape and position of a patch for processing by the tessellator stage 308. The patch constants include at least tessellation factors, which define how the output patch is to be subdivided by the tessellator stage 308. The tessellation factors include edge tessellation factors and may also include internal tessellation factors. The internal tessellation factors define the extent of subdivision of an internal portion of the output patch. The edge tessellation factors define the extent of subdivision of edge-adjacent portions of the output patch.

The tessellator stage 308 generates a set of domain points defined in coordinates of U and V or U, V, and W, each of which range between 0 and 1. These domain points are subdivision vertices within the patch. A variety of patch division techniques are possible.

The domain shader 310 trnsforms unit space U, V, and W locations onto the 3D space domain of the patch. Once in 3D space (or "world space"), vertices are transformed into a homogenous (x, y, z, w) coordinate system referred to as clip space. This step is analogous to what a vertex shader would do after reading vertices from a vertex buffer, for example. The domain shader stage 310 generates the world-space positions based on the instructions of the corresponding domain shader program, based on the domain points output by the tessellator stage 308, and based on the control points output by the hull shader stage 306. The domain shader stage 310 may also use patch constants such as tessellation factors output by the hull shader stage 306 in generating the output vertices. The domain shader program is flexible in that the domain shader program is able to generate the output vertices having any definable relationship to the domain points output by the tessellator stage 308. However, there are many known techniques. In a simple example, the domain shader stage 310 maps the U, V or U, V, W coordinates from the tessellator stage 308 to the world-space coordinates of the control points to generate intermediate output vertices having world-space positions. The domain shader stage 310 modifies the world-space positions of the intermediate output vertices by displacing such positions in a direction perpendicular to the plane of the patch (with no modification to the positions in the plane of the patch). The domain shader stage 310 may use the patch constants, such as tessellation factors from the hull shader stage 306, to determine the positions of the output vertices. The domain shader stage 310 also optionally generates one or more vertex parameters for each output vertex in any technically feasible manner, such as by interpolating the corresponding parameters of the control points based on the positions of the domain points output by the tessellator stage 308 in relation to the control points.

The geometry shader stage 312 performs vertex operations on a primitive-by-primitive basis. Geometry shader programs typically accept whole primitives (e.g., a collection of vertices) as input and perform operations on those whole primitives as specified by the instructions of the geometry shader programs. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. Operations for the geometry shader stage 312 may be performed by a shader program that executes on the programmable processing units 202.

The rasterizer stage 314 accepts and rasterizes simple primitives generated upstream. Rasterization consists of determining which screen pixels (or sub-pixel samples) are covered by a particular primitive. Rasterization is performed by fixed function hardware or may be performed by shader programs executing in the programmable processing units 202.

The pixel shader stage 316 calculates output values (e.g., color values) for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel, which are written to a frame buffer for output to the display device 118.

As described above, many of the stages illustrated in FIG. 3 and described as being included within the graphics processing pipeline 134 can be implemented as shader programs executing within the shader engines 132 illustrated in FIG. 2. Various operations occur in the driver 122 and within the APD 116 to facilitate executing shader programs in the shader engines 132.

As described elsewhere herein, shader programs are often specified in code by an application programmer and are compiled for use by the application program by a compiler. Typically, this compilation occurs by the driver 122 during application startup, as opposed to at draw time (i.e., after startup, when the application is actually requesting objects to be rendered). However, it is possible for the driver 122 to perform a just-in-time compilation of shader programs at draw time should the need arise.

The application defines the specific configuration of the graphics processing pipeline 134. This "graphics pipeline configuration" defines various aspects of the graphics processing pipeline 134, including which optional shader stages are used (for example, whether the geometry shader stage 312 is used, and/or whether tessellation, which uses the hull shader stage 306, tessellator stage 308, and domain shader stage 310, is used). The graphics pipeline configuration information also defines other aspects of the graphics processing pipeline 134, such as, without limitation, the specific shader programs to be used for the shader stages that are enabled and that execute shader programs (e.g., the vertex shader stage 304, pixel shader stage 316, and the hull shader stage 306, domain shader stage 310, and geometry shader stage 312 if enabled), aspects of the rasterizer stage 314 (such as which face of a triangle is the front face, how to apply depth values to pixels, how culling is to be performed, how triangles are to be filled, and other aspects), aspects of how blending and other processing occurs in the output merger stage 318, aspects of how inputs to the graphics processing pipeline 134 (e.g., input vertices) are to be interpreted, and other aspects. One example of a programming construct that defines graphics pipeline configuration is the Direct 3D version 12 Graphics Pipeline State structure (D3D12_GRAPHICS_PIPELINE_STATE_DESC structure) of the Direct 3D 12 application programming interface provided by Microsoft Corporation of Redmond, Wash., U.S. In some situations (such as in a hardware and software configuration in which Microsoft Direct X 12 is used), various pre-defined graphics pipeline configurations are communicated by the application to the driver 122 at application startup time. At draw time, the application is able to switch between different pre-defined graphics pipeline configurations by issuing requests to the driver 122 to switch to particular pre-defined graphics pipeline configuration. In other situations (such as in a hardware and software configuration in which Microsoft Direct X 11 is used), the application does not specify graphics pipeline configurations at runtime to the driver 122. Instead, the application modifies the graphics pipeline configuration, including which pipeline stages are to participate in rendering and which shader programs are to be used for the various pipeline stages, at draw time by issuing state change commands.

Shader programs have inputs and outputs that indicate how data is communicated between shader stages. These inputs and outputs represent what data is to be provided to the shader programs by previous stages of the graphics processing pipeline 134 and also what data is to be output by the shader programs to be provided to subsequent stages of the graphics processing pipeline 134. Some shader programs utilize memory load and/or store instructions to read their inputs from memory and to store their outputs to memory (such as to/from a local data store memory 212 or global memory 210). Other shader programs use other types of instructions, such as direct declarations of inputs and outputs that, when interpreted by the hardware, cause the hardware to import specific values from previous stages and place those values into local memory and/or registers for the shader program, and/or to export specific values from registers and/or local memory for the shader to locations for use by a subsequent shader stage. The transfer between stages may occur via a general-use memory (such as local data store memory 212 or global memory 210) or via more specific storage areas devoted to particular data types.

It is possible for certain shader programs to output data that is not used by any subsequent portion of a pipeline. If such output data is stored in storage such as local data store memory 212 or global memory 210, then graphics rendering is less efficient due to memory storing unused data and gaps in memory between used data. One example situation in which such inefficiencies occur is with the pair of shader programs including the hull shader and the domain shader. In this example situation, it is possible (and in fact occurs often) that an application programmer creates a single version, or limited number of versions of a particular hull shader program, and creates more version of domain shader programs. In such a situation, one or more hull shader programs are each designed to work with multiple different domain shader programs. Thus, the one or more hull shader programs would need to output all possible outputs that could be used by the various domain shaders that could work with each such hull shader. Therefore, in any particular hull shader/domain shader combination, some of the data output by the hull shader would not be used by that domain shader, and at least some of the storage space for the hull shader would be wasted. In addition, gaps in memory may exist between data that is used due to the manner in which the compiler is implemented. Reorganizing data in memory in a packed format reduces the memory footprint and increases the effective memory bandwidth. In some scenarios, the compiler 450 is not able to identify whether particular data points output by the hull shader would be used by subsequent stages of the graphics processing pipeline 200. In such situations, the compiler could use conservative estimation or runtime checking. In one example, a patch has an edge tessellation factor that is less than or equal to 0 or not a number. In such scenarios, the compiler generates additional instructions in the hull shader to check the tessellation factors at runtime.

Figure 4:
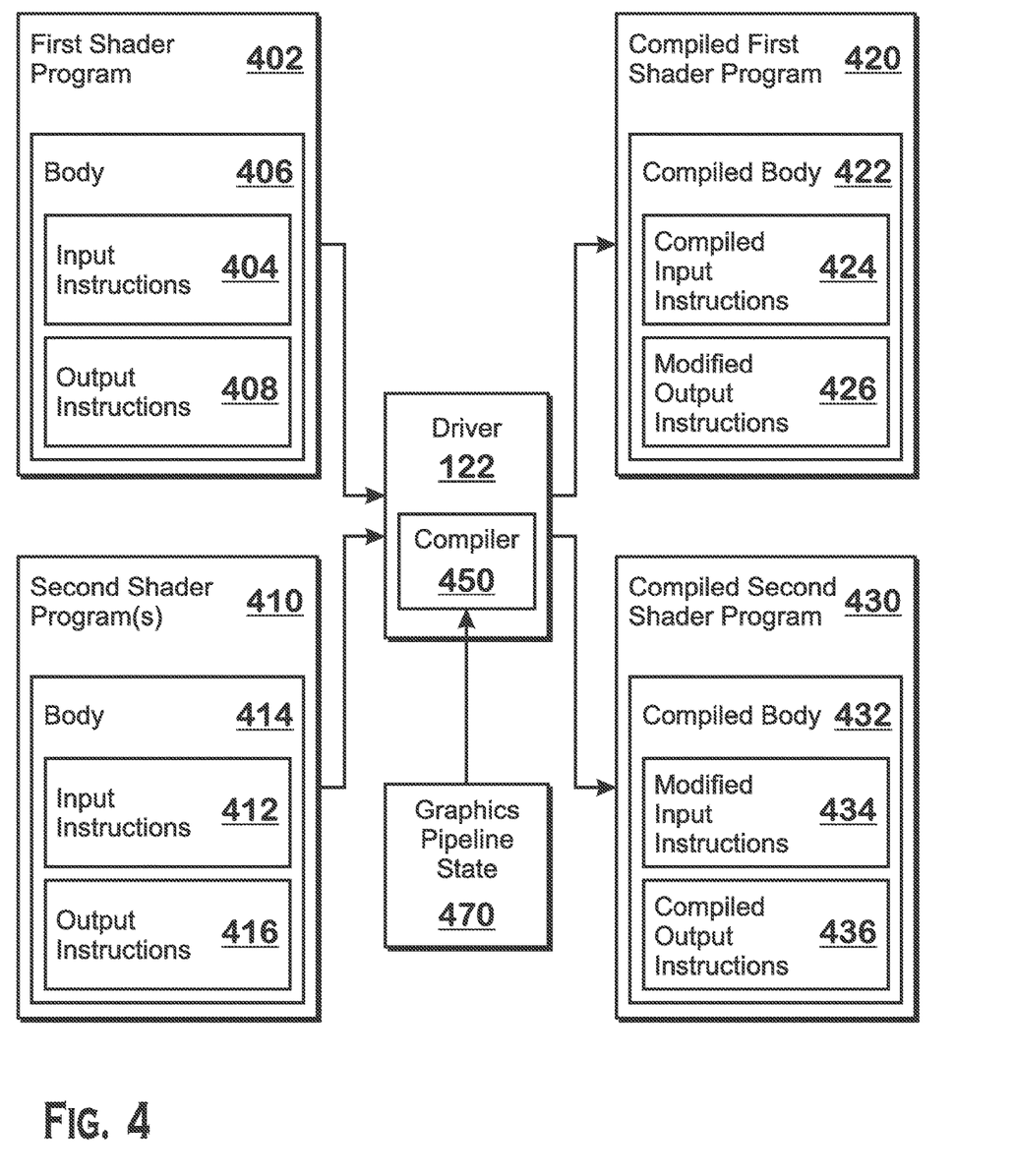
FIG. 4 illustrates a technique for improving memory usage for inter-shader communication of data, according to an example.

FIG. 4 illustrates a technique for improving memory usage for inter-shader communication of data, according to an example. Generally, the technique involves modifying a shader program that outputs data based on knowledge of how one or more other shader programs uses that data, as well as modifying the one or more other shader programs that uses the data. A compiler 450 is illustrated as being a part of the driver 122. The compiler 450 accepts code specified in an application program and compiles that code to generate compiled shader programs for use in various stages of the graphics processing pipeline 134. The driver 122 transmits the compiled shader programs to the graphics processing pipeline 134 for execution. Although the compiler 450 is illustrated as part of the driver 122, those of skill in the art will understand that the compiler 450 could alternatively be independent or part of another software module.

As described elsewhere herein, the application specifies graphics pipeline configuration information that specifies the optional shader stages that are enabled and the specific shader programs to be used for the various stages of the graphics processing pipeline 134. This graphics pipeline configuration information is represented in FIG. 4 as graphics pipeline state 470.

The driver 122 examines the graphics pipeline state 470 to determine which shader stages are enabled, as well as which specific shader programs are used for those stages. The driver 122 determines that the first shader program 402 is used for one of the pipeline stages and that one or more second shader programs 410 are used for a subsequent pipeline stage and passes that determined information to the compiler 450. The compiler 450 analyzes the instructions of the first shader program 402 and, in some situations, the instructions of the second shader program(s) 410 to determine whether the first shader program 402 outputs data that is not used by any of the second shader program(s) 410 (this analysis is referred to elsewhere herein as "output use analysis").

In some implementations, the compiler 450 knows that certain outputs from certain shader programs can only be used by certain other shader programs. In such situations, for any particular analyzed first shader program 402, the compiler 450 limits the second shader program(s) analyzed 410 for the output use analysis to those shader programs that could possibly use the data output from the first shader program 402 (for example, it is known that hull shaders output data only used by domain shaders, so the compiler 450 would limit at least one instance of the output use analysis in which the hull shader program is the first shader program 402 such that only a domain shader program is analyzed as the second shader program 410). In other implementations, the compiler analyzes each shader program that executes after the shader program that outputs data to determine whether the data output is used by any other shader program. If, in response to performing the output use analysis, the compiler 450 determines that some of the data output by the first shader program 402 is not used by any of the second shader programs 410, then the compiler 450 modifies one or more of the first shader program 402 and the second shader programs 410 based on the output use analysis.

The output use analysis performed by the compiler 450 includes identifying the data output by the first shader program 402. More specifically, the compiler 450 examines the output instructions 408 to identify data that is output by the first shader program 402. In some situations, each particular data that is output by the first shader program 402, the compiler 450 examines the second shader programs 410 to determine if there is any data output by the first shader program 402 that is not used by any of the second shader programs 410.

To determine whether there is any data output by the first shader program 402 that is not used by any of the second shader programs 410, the compiler 450 examines the input instructions 412 of each of the second shader programs 410 to determine if the input instructions 412 input all of the data that is output by the output instructions 408 of the first shader program 402. If there is any data output by the output instructions 408 of the first shader program 402 that is not input by the input instructions 412 of any of the second shader programs 410, then the compiler 450 determines that such data is not used by any of the second shader programs 410. In some situations, checks regarding whether data is used by a second shader program 410 cannot be performed at compile time. In those situations, the compiler 450 inserts instructions to perform runtime checking to detect whether data output from the first shader program 402 will be used by subsequent shader programs (one example of this is a hull shader that determines whether patches are to be culled based on a tessellation factor being less than or equal to zero).

If the compiler 450 determines that there is no data that is unused by the second shader programs 410 and that no gaps would exist between data passed from the first shader program to a second shader program in memory, then the compiler 450 does not modify the first shader program 402 or the second shader program 410 according to the techniques described herein. If gaps would exist between used data in memory, then the compiler 450 applies data packing to the data. The compiler modifies both output instructions in the first shader program and input instructions in the second shader program to access memory according to a packed format. If the compiler 450 determines that there is data that is not used by any of the second shader programs 410, then the compiler 450 does not generate memory writes or stores for the unused data of the first shader program. In the situation that data packing is performed after identifying the unused data, the compiler 450 generates output instructions in the first shader program and input instructions in the second shader program in a form that accesses the memory data in the packed format. In some situations, the compiler 450 inserts instructions to perform runtime checking for unused data (such as to check whether the tessellation factors number is less than 0).

The concept of packing data is now described in more detail. Some output instructions 408 that output data that is not used by any of the second shader programs 410 output multiple items of data. In an example, an output instruction of a hull shader program outputs multiple control point data points for consumption by a domain shader program, but at least some of those control point data points are not used by the domain shader program. For an output instruction that outputs multiple items of data, the compiler 450 determines which of those items of data are not used by any of the second shader programs 410. The compiler 450 deletes the memory write or store instructions if all of those items of data are not used, or generates instructions only writing or storing the data that are used. If gaps between data would exist in memory according to the original output instructions or after output use analysis, then the compiler 450 performs data packing. This data packing includes identifying the memory locations of the data that is used by the second shader programs. The compiler 450 uses this information to generate the modified output instructions 426 for the packed data in the first shader program 420 and the modified input instructions 434 that use those packed data in the second shader program 430. Data packing also allows the compiler 450 to aggregate output and input instructions of small size such that fewer instructions operating on larger chunks of data are executed.

Packing data items reduces the total memory space allocated for the data items and enables the compiler 450 to aggregate multiple memory access instructions. Identifying unused data by output use analysis helps data packing to pack only those data that are used. In an example, a first output instruction outputs four data items, but only one is used by a second shader program 410, and a second output instruction outputs a different four data items, but only three are used by a second shader program 410. Packing these data items allows the compiler 450 to generate one output instruction that outputs the four items that are used (one data item plus three data items). Note, it is possible for the packing to be imperfect such that the generated output instructions 426 include at least some output instructions that output some unused data. In a modification to the example above, if the first output instruction and the second output instruction both output one data item, then an output instruction that results may output four items of data, with only two of those items used. However, this result would be better than two output instructions that only output one item of data each, since in that scenario, less memory is used, with memory for four data items instead of eight data items being used, and fewer memory instructions are issued, with one output instruction instead of two output instructions being issued.

In addition to generating the modified output instructions 426, the compiler 450 also generates modified input instructions 434 based on the input instructions 412 of the second shader programs 410. More specifically, in a second shader program 410, the input instructions 412 input data of the same format as the data output by the output instructions 408. When data are packed in memory, the compiler 450 generates modified input instructions 434 in the second shader program 430 to input the data having the packed format. Using the above example, the compiler 450 generates one input instruction to input the data items that are used in the body 432 of the second shader program 430, or in a less ideally packed format (four data items), generates an input instruction to input four data items in which two of them are used in the body 432. Input data are usually read from memory to registers or local memory such as the local data store memory 212 before being used in the rest of the shader program.

As described above, the output use analysis, in which the compiler 450 determines which data items output by the first shader program 402 are used by no other second shader programs 410, can be limited to certain shader stages (and thus certain programs defined by the particular graphics pipeline state 470). One example of a situation in which the compiler 450 limits the analysis to certain shader programs involves the hull shader stage 306 and the domain shader stage 310, which together with the fixed-function tessellator stage 308, implement tessellation. In this example, a hull shader program outputs patch control points and patch constants that include tessellation factors and a domain shader program inputs control points output from the hull shader, the domain points output from the tessellation stage 308, and the patch constants from the hull shader program. In this situation, the compiler 450 analyzes the output instructions of the hull shader program and the input instructions of the domain shader program to determine whether there is data output by the hull shader program (e.g., patch control points or patch constants) that is not input by the domain shader program. Upon determining that such data exists, the compiler 450 modifies the hull shader program and/or the domain shader program in accordance with the techniques described herein. The compiler 450 does not analyze any other shader program (such as the geometry shader program or the pixel shader program) to determine whether the outputs of the hull shader program is used by any of those other shader programs.

Note that for different graphics pipeline states 470, it is possible for different versions of the shader programs to be used. The compiler 450 performs the analysis described herein for various graphics pipeline states. Thus it is possible for the compiler 450 to modify different first shader programs differently or even to modify one shader program, used in one graphics pipeline state, differently than the same shader program used in a different graphics pipeline state. For example, it is possible for one first shader program to be used in conjunction with a second shader program in a first graphics pipeline state but for the same first shader program to be used in conjunction with a different second shader program in a second graphics pipeline state. In this situation, the compiler 450 performs the analysis and modification of shader programs described herein for each graphics pipeline state, which may thus result in different modified version of the same first shader program for different graphics pipeline states.

Figure 5:
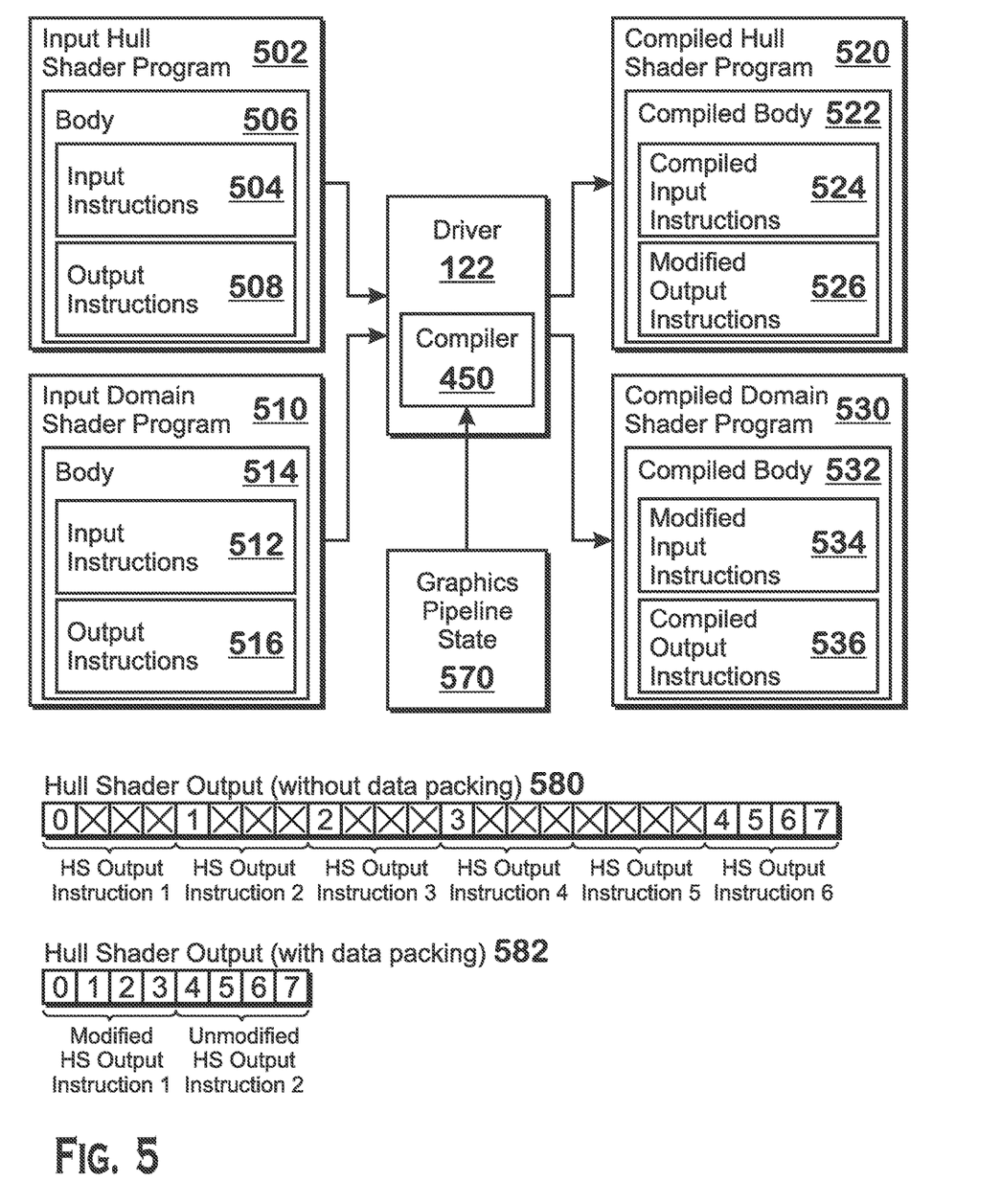
FIG. 5 is a block diagram illustrating analysis of a hull shader program and domain shader program pair, according to an example.

FIG. 5 is a block diagram illustrating analysis of a hull shader program and domain shader program pair, according to an example. The graphics pipeline state 570 is similar to the graphics pipeline state 470 of FIG. 4, with the specific feature that graphics pipeline state 570 specifies that tessellation is enabled, and further specifies that the hull shader program 502 and the domain shader program 510 are to be used for the hull shader stage 306 and domain shader stage 310, respectively.

The input hull shader program 502 and the input domain shader program 510 are pre-compilation programs, for example, as specified by an application. The compiler 450 converts these shader programs to a compiled hull shader program 520 and a compiled domain shader program 530, respectively. The input hull shader program 502, as specified by the application, includes input instructions 504, a body 506, and output instructions 508. The input instructions 504 cause hull shader input data such as patch control points to be input (e.g., from a location written to by the vertex shader stage 304) to a location available to instructions in the body 506. The body 506 includes instructions for performing the work of the hull shader, such as processing or modifying inputs and generating one or more of patch control points and patch constants data based at least in part on the input hull shader input data. The output instructions 508 cause data, such as the generated one or more patch control points or patch constants, to be written to an output location that is available for input by the domain shader program 510 (as well as the tessellator stage 308). In some implementations, this output location is a memory, such as local data store memory 212 or global memory 210.

The domain shader program 510, as specified by the application, includes input instructions 512, a body 514, and output instructions 516. The input instructions 512 cause domain shader input data such as control points output from the hull shader program 502, the domain points generated by the tessellator stage 308, and the patch constants output by the hull shader program 502, to be read in and placed in locations available to the instructions of the body 414 (such as within registers or a local data store memory 212). The body 514 includes instructions that generate output vertices based on the input data, and the output instructions 516 output the output vertices to a location (such as specialized memory, local data store memory 212, or global memory 210) for use by subsequent stages.

In operation, the compiler 450 examines the graphics pipeline state 570 and determines that the pipeline to be used for rendering subsequent geometry has tessellation enabled and that the hull shader program and domain shader program are the hull shader program 502 and domain shader program 510 illustrated in FIG. 5. The compiler 450 analyzes the output instructions 508 of the hull shader program 502 and the input instructions 512 of the domain shader program 510. The compiler 450 determines that at least some instructions of the output instructions 508 output at least some control points or patch constants that are not input by the input instructions 512. In response to this determination, the compiler 450 generates modified output instructions 526 from output instructions 508 in the input hull shader program 502 and modified input instructions 534 from input instructions 512 in the input domain shader program 510 if the data layout in memory is changed by the data packing. The term "modified" means that the compiled instructions are different than if the techniques disclosed herein were not applied. The compiler does not generate output instructions that output control points or patch constants that are not used by input instructions 512 of the domain shader 510. When gaps exist in memory between used data including control points and patch constants, the compiler 450 configures the instructions to perform data packing. Specifically, the compiler 450 keeps track of the memory location of the packed control point and patch constant data. The compiler 450 uses the information to transform output instructions 508 in the input hull shader program 502 into modified output instructions 526 in the modified hull shader program 420 to output control points and patch constants to memory in a packed format. The compiler 450 also uses this information to transform input instructions 512 in the input domain shader program 510 into modified input instructions 534 in the generated domain shader program 530 to input control points and patch constants from memory in a packed format. Multiple output instructions from the input hull shader program 502 are "aggregated" in the modified output instructions 526 if their output data are consecutive in memory and the combined data size fits in a memory output instruction. Similarly, multiple input instructions 512 of the input domain shader program 510 are aggregated in the modified input instructions 534 if their input data are consecutive in memory and the combined data size fits in a memory input instruction. Data input by modified input instructions 534 are loaded into registers or local memory such as local data store memory 212 before the data are used by the rest of the body 532. There are cases where runtime checking is used to identify data output by the hull shader that is not used by the domain shader. Such cases include data for patches that will be culled based on the computed tessellation factors (e.g., a tessellation factor is 0, less than 0, or not-a-number). The compiler 450 generates additional instructions to check the values of the tessellation factors to determine whether the patch is to be culled and does not generate output instructions in modified output instructions 526 for the data of those culled patches.

A specific example of data packing and generating output instructions for a hull shader with data packing is also illustrated. Data layout 580 in memory for output instructions in a hull shader program that are generated without data packing are shown. Additionally, data layout 582 in memory according to output instructions in the hull shader generated with data packing are shown. The hull shader output without data packing 580 includes 6 output instructions. Instructions 1 through 4 each output one control point or patch constant data element input by a corresponding domain shader. Instruction 5 outputs no control points or patch constant data elements used by the corresponding domain shader. All of the control points or patch constant data elements output by instruction 6 are used by the corresponding domain shader. The control points or patch constant data elements are provided arbitrary numbering from 0 to 7 for clarity. Control points or patch constant data elements in memory that are not input by the domain shader are marked with an "X."

In response to identifying that the control points or patch constant data elements 0 to 7 are input by the domain shader and that the other control points or patch constant data elements are not input by the domain shader, the compiler generates the modified hull shader output instructions 582. More specifically, the compiler 450 determines that all 8 data elements can be packed in memory as shown in the hull shader output with data packing 582. The compiler 450 also determines that the first four data elements can be output by a single instruction—modified HS output instruction 1 and that the second four data elements can be output by another single instruction—modified HS output instruction 2. This packing reduces the memory footprint from the size of 24 data element to the size of 8 data elements and also reduces the number of memory access instructions from 6 to 2. In addition, the compiler 450 generates corresponding input instructions for the domain shader program, which are configured to input the data in the packed format. These packed-format input instructions for the domain shader program result in a reduction in the number of instructions used, as the instructions that would input unpacked data are aggregated into fewer instructions.

In some circumstances, the compiler 450 inserts additional instructions to check at runtime whether data output by a shader stage is to be used by any subsequent shader stage. Specifically, for the hull shader and domain shader combination, a patch that has an edge tessellation factor of less than or equal to zero or not-a-number will be culled and data for this patch will not be used in the domain shader. The compiler 450 thus inserts instructions to check the value of the tessellation factors once computed and to prevent outputting data for a culled patch.

It is possible for one graphics pipeline state 570 to specify that a hull shader is to be used with a particular domain shader and for a second graphics pipeline state 570 to specify that the same hull shader is to be used with a different domain shader. In this instance, the compiler 450 would generate two different versions of the hull shader, one for use with each domain shader (assuming the domain shaders use the data output by the hull shader differently, of course).

Figure 6:
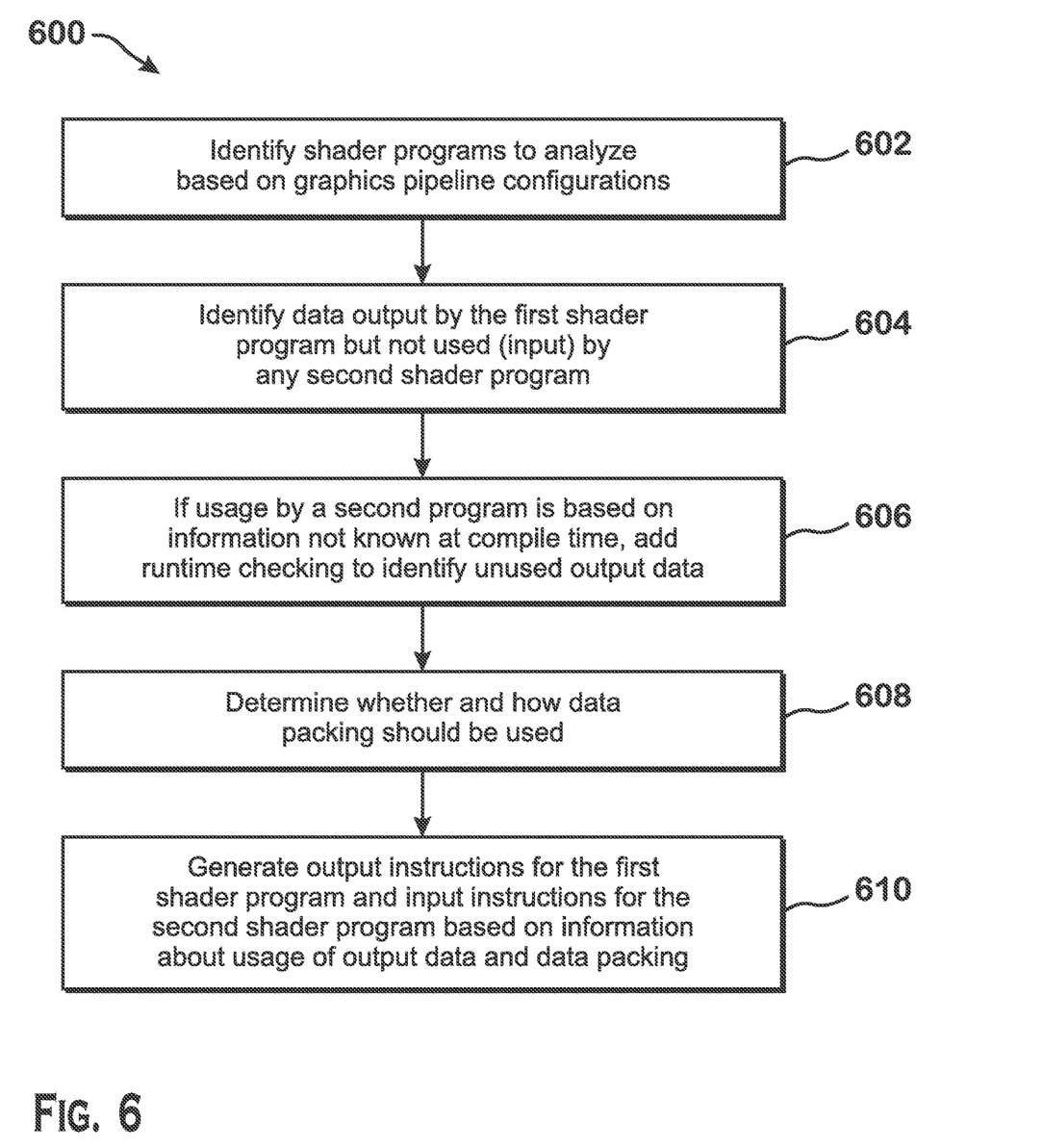
FIG. 6 is a flow diagram of a method for modifying shader programs to reduce the memory footprint of data transmitted between the shader programs, according to an example.

FIG. 6 is a flow diagram of a method 600 for modifying shader programs to reduce the number of memory accesses and the memory footprint of data transmitted between the shader programs, according to an example. Although described with respect to the system shown and described with respect to FIGS. 1-5, it should be understood that any system configured to perform the method, in any technically feasible order, falls within the scope of the present disclosure.

The method 600 begins at step 602, where a compiler 450 identifies shader programs to analyze based on the graphics pipeline configuration (e.g., included within graphics pipeline state 470 or graphics pipeline state 570). The graphics pipeline configuration may be pre-defined at application startup time (as is the case with, for example, Direct3D 12) or may be modified at draw-time. If pre-defined at application startup time, the compiler 450 is able to perform the method 600 to reduce memory footprint of data transmitted between shader programs also at application startup time in shader compilation. If modified at draw-time, the compiler 450 is capable of performing the method 600 also at draw time, during a just-in-time compilation of the shader programs analyzed.

The graphics pipeline configuration defines the specific shader stages that are to be used as well as the specific shader programs used at the stages that support programmable shader stages. The compiler 450 identifies a first shader program to analyze and identifies one or more second shader programs to analyze based on the identified first shader program. The first shader program may be any shader program specified by the graphics pipeline configuration. The second shader programs are shader programs that are known to use data output by the first shader program. In one example, a hull shader outputs data such as control points and patch constants and a domain shader inputs those control points and patch constants.

At step 604, the compiler 450 identifies data output by the first shader program but not used by any second shader program. At step 606, the compiler 450 determines data for which usage in the second shader program cannot be known at compile time, and adds instructions for runtime checking and removal of data if such data is not used. At step 608, for used data that, when written to memory, has gaps, the compiler 450 determines whether and how data packing should be used. At step 610, the compiler 450 applies data packing, generating output instructions for the first shader and input instructions for the second shader that write and read data in a packed format.

A method for modifying at least one shader program of one or more shader programs to improve memory performance for data transmitted between the shader programs is provided herein. The method includes identifying a first shader program and a second shader program for analysis based on graphics pipeline state, first determining, including determining whether there are data points output by the first shader program that are not input by the second shader program, second determining, including determining whether identification of data points output by the first shader program but not input by the second shader program cannot be performed at compile time and can be performed at runtime, modifying the first shader program based on the first determining and the second determining to generate a compiled first shader program, and outputting the compiled first shader program for execution in the graphics processing pipeline.

A computer system for modifying at least one shader program of one or more shader programs to improve memory performance for data transmitted between the shader programs is provided. The computer system includes an accelerated processing device including a graphics processing pipeline configured to execute shader programs to render graphics and a processor configured to execute a compiler. The compiler is configured to identify a first shader program and a second shader program for analysis based on graphics pipeline state, perform first determining, including determining whether there are data points output by the first shader program that are not input by the second shader program, perform second determining, including determining whether identification of data points output by the first shader program but not input by the second shader program cannot be performed at compile time and can be performed at runtime, and modify the first shader program based on the first determining and the second determining to generate a compiled first shader program to be output for execution in the graphics processing pipeline.

A non-transitory computer-readable medium is provide that stores instructions that, when executed by a processor, modify at least one shader program of one or more shader programs to improve memory performance for data transmitted between the shader programs, by: identifying a first shader program and a second shader program for analysis based on graphics pipeline state, first determining, including determining whether there are data points output by the first shader program that are not input by the second shader program, second determining, including determining whether identification of data points output by the first shader program but not input by the second shader program cannot be performed at compile time and can be performed at runtime, modifying the first shader program based on the first determining and the second determining to generate a compiled first shader program, and outputting the compiled first shader program for execution in the graphics processing pipeline.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for modifying at least one shader program of one or more shader programs to improve memory performance for data transmitted between the shader programs, the method comprising:
    identifying a first shader program and a second shader program for analysis based on graphics pipeline state;
    first determining, including determining whether there are data points output by the first shader program that are not input by the second shader program;
    second determining, including determining whether identification of data points output by the first shader program but not input by the second shader program cannot be performed at compile time and can be performed at runtime;
    modifying the first shader program based on the first determining and the second determining to generate a compiled first shader program; and
    outputting the compiled first shader program for execution in the graphics processing pipeline.

2. The method of claim 1, further comprising:
    third determining, including determining whether gaps exist between used data according to unmodified instructions of the first shader program.

3. The method of claim 1 wherein the modifying the first shader program based on the first determining and the second determining comprises:
    modifying at least one output instruction of the first shader program to output no data that is not used by the second shader program.

4. The method of claim 1, wherein the modifying the first shader program based on the first determining and the second determining comprises:
    modifying at least one output instruction of the first shader program to output data in a packed format that aggregates multiple outputs of consecutive data.

5. The method of claim 4, further comprising:
modifying the second shader program based on the modifications made to the at least one output instruction of the first shader program to input data in a packed format.

6. The method of claim 1, wherein:
the first shader program is a hull shader program and the second shader program is a domain shader program.

7. The method of claim 6, wherein:
the data points output by the first shader program are one or both of control points and patch constants.

8. The method of claim 1, wherein:
the graphics pipeline state is pre-defined at application startup; and
the identifying, determining, and modifying steps occur at application startup.

9. The method of claim 1, wherein:
the graphics pipeline state is specified at draw time; and
the identifying, determining, and modifying steps occur at draw time.

10. A computer system for modifying at least one shader program of one or more shader programs to improve memory performance for data transmitted between the shader programs, comprising:
an accelerated processing device including a graphics processing pipeline configured to execute shader programs to render graphics; and
a processor configured to execute a compiler that is configured to:
identify a first shader program and a second shader program for analysis based on graphics pipeline state;
perform first determining, including determining whether there are data points output by the first shader program that are not input by the second shader program;
perform second determining, including determining whether identification of data points output by the first shader program but not input by the second shader program cannot be performed at compile time and can be performed at runtime; and
modify the first shader program based on the first determining and the second determining to generate a compiled first shader program to be output for execution in the graphics processing pipeline.

11. The computer system of claim 10, wherein the compiler is further configured to:
perform third determining, including determining whether gaps exist between used data according to unmodified instructions of the first shader program.

12. The computer system of claim 10 wherein the modifying the first shader program based on the first determining and the second determining comprises:
modifying at least one output instruction of the first shader program to output no data that is not used by the second shader program.

13. The computer system of claim 10, wherein the modifying the first shader program based on the first determining and the second determining comprises:
modifying at least one output instruction of the first shader program to output data in a packed format that aggregates multiple outputs of consecutive data.

14. The computer system of claim 13, wherein the compiler is further configured to:
modify the second shader program based on the modifications made to the at least one output instruction of the first shader program to input data in a packed format.

15. The computer system of claim 10, wherein:
the first shader program is a hull shader program and the second shader program is a domain shader program.

16. The computer system of claim 15, wherein:
the data points output by the first shader program are one or both of control points and patch constants.

17. The computer system of claim 10, wherein:
the graphics pipeline state is pre-defined at application startup; and
the identifying, determining, and modifying steps occur at application startup.

18. The computer system of claim 10, wherein:
the graphics pipeline state is specified at draw time; and
the identifying, determining, and modifying steps occur at draw time.

19. A non-transitory computer-readable medium storing instructions that, when executed by a processor, modify at least one shader program of one or more shader programs to improve memory performance for data transmitted between the shader programs, by:
identifying a first shader program and a second shader program for analysis based on graphics pipeline state;
first determining, including determining whether there are data points output by the first shader program that are not input by the second shader program;
second determining, including determining whether identification of data points output by the first shader program but not input by the second shader program cannot be performed at compile time and can be performed at runtime;
modifying the first shader program based on the first determining and the second determining to generate a compiled first shader program; and
outputting the compiled first shader program for execution in the graphics processing pipeline.

20. The non-transitory computer-readable medium of claim 19, wherein:
the first shader program is a hull shader program and the second shader program is a domain shader program.

* * * * *